(12) United States Patent
Tong et al.

(10) Patent No.: US 10,929,089 B2
(45) Date of Patent: Feb. 23, 2021

(54) DISPLAY PANEL BEZEL, DISPLAY TERMINAL, SPLICED DISPLAY DEVICE, AND IMAGE OUTPUT CONTROL METHOD

(71) Applicant: BOE Technology Group Co., Ltd., Beijing (CN)

(72) Inventors: Lu Tong, Beijing (CN); Shuo Chen, Beijing (CN); Tianyue Zhao, Beijing (CN); Enhui Guan, Beijing (CN); Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/342,140

(22) PCT Filed: Sep. 13, 2018

(86) PCT No.: PCT/CN2018/105430
§ 371 (c)(1),
(2) Date: Apr. 15, 2019

(87) PCT Pub. No.: WO2019/056976
PCT Pub. Date: Mar. 28, 2019

(65) Prior Publication Data
US 2019/0258443 A1    Aug. 22, 2019

(30) Foreign Application Priority Data

Sep. 19, 2017 (CN) .......................... 201710846405.0

(51) Int. Cl.
*G06F 3/147* (2006.01)
*G06F 3/14* (2006.01)
*G09F 9/302* (2006.01)

(52) U.S. Cl.
CPC ................ *G06F 3/147* (2013.01); *G06F 3/14* (2013.01); *G06F 3/1423* (2013.01); *G09F 9/302* (2013.01); *G09F 9/3023* (2013.01)

(58) Field of Classification Search
CPC ........ G06F 3/14; G06F 3/1423; G06F 3/1446; G06F 3/147; G09F 9/302; G09F 9/3023
(Continued)

(56) References Cited

U.S. PATENT DOCUMENTS

2013/0279012 A1* 10/2013 Lee .................... G02B 3/0043
  359/622
2014/0268504 A1    9/2014 Carlson et al.
(Continued)

FOREIGN PATENT DOCUMENTS

| CN | 104317544 A | 1/2015 |
|---|---|---|
| CN | 104347002 A | 2/2015 |

(Continued)

OTHER PUBLICATIONS

First Office Action, including Search Report, for Chinese Patent Application No. 201710846405.0, dated Dec. 30, 2019, 16 pages.
(Continued)

*Primary Examiner* — Kwin Xie
(74) *Attorney, Agent, or Firm* — Westman, Champlin & Koehler, P.A.

(57) ABSTRACT

A display panel bezel, a display terminal, a spliced display device and an image output control method are provided. The display panel bezel includes at least two bezel portions forming an accommodating space for mounting a display panel, wherein each bezel portion includes an identity identifier and an identification device configured to identify the identity identifier and obtain at least one identity identifier of at least one bezel portion of the at least two bezel portions connected to the bezel portion.

16 Claims, 6 Drawing Sheets

(58) Field of Classification Search
USPC .................................................. 345/173–174
See application file for complete search history.

(56) References Cited

U.S. PATENT DOCUMENTS

| | | | |
|---|---|---|---|
| 2015/0261364 A1 | 9/2015 | Cady et al. | |
| 2015/0363154 A1* | 12/2015 | Frederick | G06F 3/1423 345/1.3 |
| 2015/0379964 A1* | 12/2015 | Lee | G06F 3/0412 345/173 |
| 2016/0155410 A1* | 6/2016 | Nam | G09G 5/005 715/745 |
| 2016/0364196 A1 | 12/2016 | Sun | |
| 2017/0337028 A1 | 11/2017 | Yu-Fu et al. | |
| 2018/0004474 A1* | 1/2018 | Li | H04M 1/0256 |
| 2018/0330694 A1* | 11/2018 | Klein | G06F 3/03545 |

FOREIGN PATENT DOCUMENTS

| | | |
|---|---|---|
| CN | 104850384 A | 8/2015 |
| CN | 105404486 A | 3/2016 |
| CN | 106020758 A | 10/2016 |
| CN | 205750196 U | 11/2016 |
| CN | 106569768 A | 4/2017 |
| CN | 106598527 A | 4/2017 |
| CN | 106648514 A | 5/2017 |

OTHER PUBLICATIONS

The International Search Report, for International Application No. PCT/CN2018/105430 dated Dec. 19, 2018, 7 pages.

The Written Opinion, including English translation of Box V, for International Application No. PCT/CN2018/105430 dated Dec. 19, 2018, 9 pages.

* cited by examiner

//  DISPLAY PANEL BEZEL, DISPLAY TERMINAL, SPLICED DISPLAY DEVICE, AND IMAGE OUTPUT CONTROL METHOD

CROSS-REFERENCE TO RELATED APPLICATION

This application is a U.S. national phase application of PCT Application No. PCT/CN2018/105430 filed on Sep. 13, 2018, which claims a priority to a Chinese Patent Application No. 201710846405.0 filed in China on Sep. 19, 2017, the disclosure of which is incorporated in their entirety by reference herein.

TECHNICAL FIELD

The present disclosure relates to the field of display technology, and in particular to a display panel bezel, a display terminal, a spliced display device, and an image output control method.

BACKGROUND

With development of a display technique and a digital image processing technique, electronic displays have been widely used in various fields. Electronic display products may be hung in hotels, restaurants, shopping malls and homes for playing videos or displaying photos, paintings, advertisements, etc.

SUMMARY

A display panel bezel, a display terminal, a spliced display device and an image output control method are provided in the present disclosure.

In a first aspect, a display panel bezel is provided in the present disclosure and includes: at least two bezel portions connected to each other to form an accommodating space for mounting a display panel, wherein each of the at least two bezel portions includes an identity identifier and an identification device, the identification device is configured to obtain at least one identity identifier of at least one other bezel portion spliced with the bezel portion.

Optionally, each of the at least two bezel portions further includes an information transmission device, the information transmission device is configured to transmit the identity identifier of the bezel portion and the at least one identity identifier of the at least one other bezel portion.

Optionally, each of the at least two bezel portions is provided with an identifier output device configured to output the identity identifier of the bezel portion.

Optionally, the identifier output device is located at a first end of the bezel portion, the identification device is located at a second end of the bezel portion other than the first end, and the information transmission device is located between the identifier output device and the identification device.

Optionally, each of the bezel portions is a first type bezel portion or a second type bezel portion; in response to the bezel portion being the first type bezel portion, the identifier output device is configured to output a first identity identifier; or in response to the bezel portion being the second type bezel portion, the identifier output device is configured to output a second identity identifier.

Optionally, the first type bezel portion has a first length and the second type bezel portion has a second length.

Optionally, in a state in which the at least two bezel portions form the accommodating space, one of the at least two bezel portions belonging to the first type bezel portion is arranged in a direction parallel to a first direction, and one of the at least two bezel portions belonging to the second type bezel portion is arranged in a direction parallel to a second direction.

Optionally, the at least two bezel portions include a first bezel portion, a second bezel portion, a third bezel portion and a fourth bezel portion, wherein one end of the first bezel portion provided with the identifier output device is connected to one end of the second bezel portion provided with the identifier output device, and one end of the third bezel portion provided with the identification device is connected to one end of the fourth bezel portion provided with the identification device.

Optionally, the at least two bezel portions include a first bezel portion, a second bezel portion, a third bezel portion and a fourth bezel portion, wherein a second end of the first bezel portion provided with the identification device is connected to a first end of the second bezel portion provided with the identifier output device, a second end of the second bezel portion provided with the identification device is connected to a first end of the third bezel portion provided with the identifier output device, a second end of the third bezel portion provided with the identification device is connected to a first end of the fourth bezel portion provided with the identifier output device, and a second end of the fourth bezel portion provided with the identification device is connected to a first end of the first bezel portion provided with the identifier output device.

Optionally, the identity identifiers are character codes, one-dimensional codes or two-dimensional codes.

Optionally, the identifier output device is configured to display the identity identifier of the bezel portion, or to output the identity identifier of the bezel portion in a data transmission manner.

Optionally, the identification device includes an infrared detecting unit, an image scanning unit or a signal receiving unit.

Optionally, in a state in which the at least two bezel portions form the accommodating space, two adjacent ones of the at least two bezel portions are detachably connected to each other.

Optionally, in a state in which the at least two bezel portions form the accommodating space, the accommodating space is formed as a quadrangular structure in which edges of the quadrangular structure is enclosed.

In a second aspect, a display terminal is provided in the present disclosure and includes: at least one display panel, and the display panel bezel according to the first aspect, wherein each of the bezel portions of the display panel bezel is disposed along an edge of the at least one display panel.

Optionally, the display terminal further includes a controller. The controller is connected to an information transmission device of each of the bezel portions of the display panel bezel and configured to: obtain an identity identifier of each of the bezel portions and at least one identity identifier of at least one other bezel portion spliced with the bezel portion; determine splicing regions formed by splicing the bezel portions for the at least one display panel based on the identity identifier of each of the bezel portions and the at least one identity identifier of the at least one other bezel portion spliced with the bezel portion; and segment a current output image based on the determined splicing regions such that each of the splicing regions displays a portion of the segmented image.

In a third aspect, a spliced display device is provided in the present disclosure and includes: a plurality of the display terminals according to the second aspect, wherein the identification device of each of the bezel portions of the display panel bezel of each of the display terminals is configured to read at least one identity identifier of at least one other bezel portion spliced with the bezel portion.

In a fourth aspect, an image output control method applied to the spliced display device according to the third aspect, wherein the image output control method includes: obtaining an identity identifier of a bezel portion of a plurality of bezel portions for one of a plurality of display panels and an identity identifier of a bezel portion of the plurality of bezel portions for another of the plurality of display panels spliced with the display panel; determining, based on the identity identifier of each of the plurality of bezel portions and at least one identity identifier of at least one other bezel portion spliced with the bezel portion of the plurality of bezel portions, splicing regions formed by splicing the plurality of the display panels; and segmenting a current output image based on the determined splicing regions, so that each of the splicing regions displays a portion of the segmented image.

Optionally, the determining, based on the identity identifier of each of the plurality of bezel portions and at least one identity identifier of at least one other bezel portion spliced with the bezel portion of the plurality of bezel portions, splicing regions formed by splicing the plurality of the display panels, includes: determining a splicing type between each of the bezel portions and the at least one other bezel portion spliced with the bezel portion based on the identity identifier of the bezel portion and the at least one identity identifier of the at least one other bezel portion spliced with the bezel portion, wherein the splicing type is a splicing type of mutual perpendicularity in which the bezel portion and the at least one other bezel portion spliced with the bezel portion are arranged perpendicularly to each other, or a splicing type of collinearity in which the bezel portion and the at least one other bezel portion spliced with the bezel portion are arranged along a same straight line; determining, based on the identity identifier of the bezel portion, the identity identifier of the at least one other bezel portion spliced with the bezel portion, and the splicing type between the bezel portion and the at least one other bezel portion, an arrangement in which each of the bezel portions is positioned relative to the spliced display device; and determining, based on the arrangement in which each of the bezel portions is positioned relative to the spliced display device, the splicing regions formed by splicing the plurality of the display panels of the spliced display device.

Optionally, the bezel portion is a first type bezel portion or a second type bezel portion; the first type bezel portion has a first identity identifier, and the second type bezel portion has a second identity identifier. Under a condition that the bezel portion belongs to the first type bezel portion, the bezel portion is arranged in a direction parallel to a first direction, and under a condition that the bezel portion belongs to the second type bezel portion, the bezel portion is arranged in a direction parallel to a second direction. The determining the splicing type between each of the bezel portions and the at least one other bezel portion spliced with the bezel portion based on the identity identifier of the bezel portion and the at least one identity identifier of the at least one other bezel portion spliced with the bezel portion, includes: in response to determining that each of the identity identifier of the bezel portion and the identity identifier of the at least one other bezel portion spliced with the bezel portion is the first identity identifier or the second identity identifier, determining that the splicing type between the bezel portion and the at least one other bezel portion spliced with the bezel portion is the splicing type of collinearity; or in response to determining that one of the identity identifier of the bezel portion and the identity identifier of the at least one other bezel portion spliced with the bezel portion is the first identity identifier and the other of the identity identifier of the bezel portion and the identity identifier of the at least one other bezel portion spliced with the bezel portion is the second identity identifier, determining that the splicing type between the bezel portion and the at least one other bezel portion spliced with the bezel portion is the splicing type of mutual perpendicularity.

Optionally, the determining, based on the identity identifier of the bezel portion, the identity identifier of the at least one other bezel portion spliced with the bezel portion, and the splicing type between the bezel portion and the at least one other bezel portion, an arrangement in which each of the bezel portions is positioned relative to the spliced display device, includes: positioning the bezel portions based on the identity identifier of each of the bezel portions, the identity identifier of the at least one other bezel portion spliced with the bezel portion, and the splicing type between the bezel portion and the at least one other bezel portion; and determining the arrangement in which each of the bezel portions is positioned relative to the spliced display device in accordance with a shape formed by the positioning.

DETAILED DESCRIPTION

Figure 1:
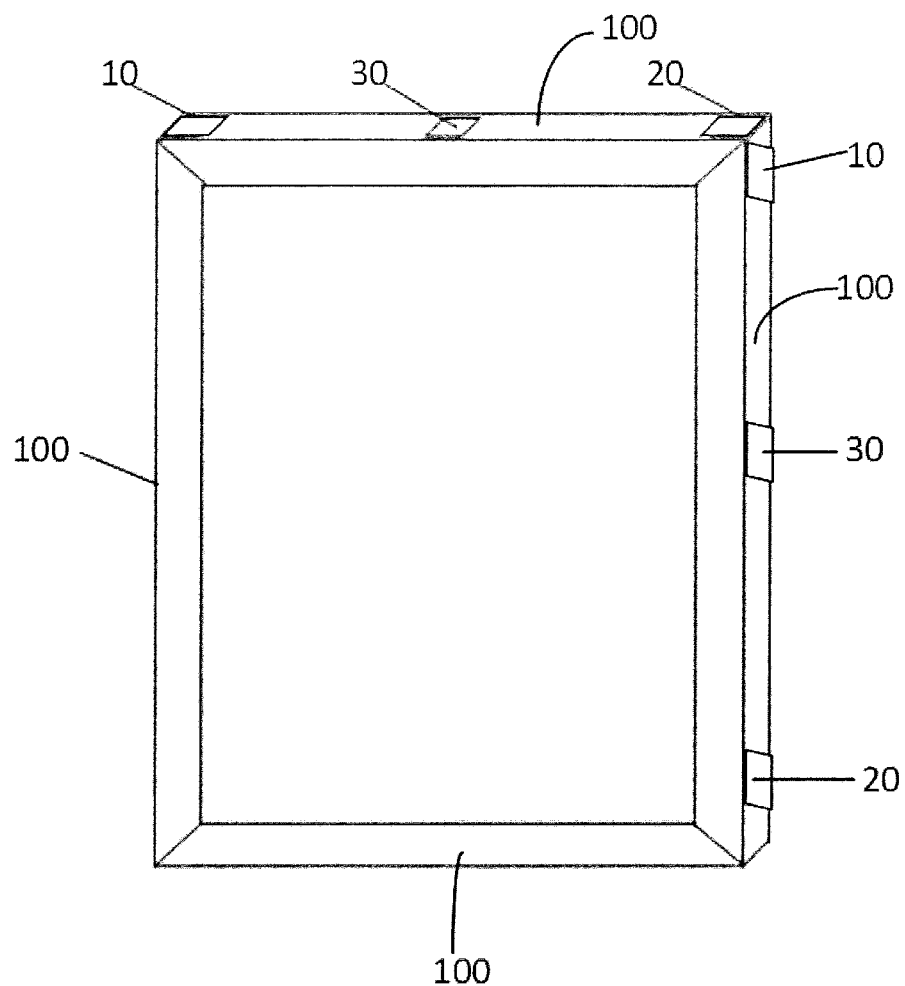
FIG. 1 is a schematic diagram showing a structure of a display panel bezel provided by some embodiments of the present disclosure.

Technical solutions in some embodiments of the disclosure will be described clearly and completely hereinafter with reference to drawings of some embodiments of the present disclosure. Apparently, the described embodiments merely relate to a part of, rather than all of, the embodiments of the present disclosure, and based on these embodiments, those skilled in the art may obtain other embodiments which also fall within the scope of the present disclosure, without exercising any inventive skill.

Some embodiments of the present disclosure provide a display panel bezel. The display panel bezel includes at least two bezel portions. The at least two bezel portions form an accommodating space for mounting a display panel. Each of the at least two bezel portions is provided with an identity identifier and an identification device. The identification device is configured to read the identity identifier.

Specifically, under a condition that the at least two bezel portions form the accommodating space for mounting the display panel, a bezel portion of the at least two bezel portions provided with the identification device may also identify at least one identity identifier of at least one bezel portion that is spliced together with the bezel portion.

For example, the identification device of a first bezel portion may be configured to identify an identity identifier of a second bezel portion that is spliced together with the first bezel portion.

For example, the identification device of the first bezel portion may be configured to identify identity identifiers of two bezel portions that are spliced together with the first bezel portion at both ends of the first bezel portion.

Each bezel portion of bezel portions included in the display panel bezel provided by some embodiments of the present disclosure has the identity identifier and the identification device capable of identifying an identity identifier of another bezel portion that is spliced together with the each bezel portion. The identity identifier of each bezel portion of the bezel portions and the identity identifier of another bezel portion that is spliced with the each bezel portion may provide analysis information for determining a position of the each bezel portion relative to the display panels, and based on the analysis information, actual splicing ranges of a plurality of splicing regions may be obtained. In a case that an image to be displayed is segmented, the image to be displayed may be segmented into multiple sub-images according to the actual ranges of the plurality of splicing regions, so that a display panel may display sub-images of a plurality of splicing regions corresponding to the display panels, thereby displaying the image in a splicing manner, reducing the cropping processing or the scaling processing performed to the image, and avoiding a problem that the display effect of the image may not be truly exhibited.

Optionally, each of the bezel portions is further provided with an information transmission device. The information transmission device is configured to transmit the identity identifier of the bezel portion.

Optionally, the information transmission device is configured to output an identity identifier of a bezel portion corresponding to the information transmission device and an identity identifier of another bezel portion spliced with the bezel portion.

Each of the bezel portions may be connected or communicated with a controller through the information transmission device for the bezel portion so that the identity identifier of the bezel portion and the identity identifier of another bezel portion spliced with the bezel portion may be transmitted to the controller. The controller may determine actual splicing regions corresponding to the bezel portions spliced with one another, based on the obtained identity identifier of each of the bezel portions and the identity identifier of another bezel portion spliced with the bezel portion.

The information transmission device may be arranged separately, or may be integrated with other devices; for example, the information transmission device may be integrated in an identification device.

The above-mentioned connection or communication may be wired connection or communication or wireless connection or communication. In order to simplify a design for wires, the above-mentioned connection or communication usually adopts a wireless design, such as a Bluetooth, a wireless local area network Wi-Fi, Zigbee, WWAN, or the like.

In some embodiments, the above-mentioned controller may be a central controller disposed on a management server for controlling a spliced display device, and based on the controller, contents required to be displayed on all display panels which are spliced together to perform a display function of the spliced display device and are connected to the management server are coordinated and distributed.

In some embodiments, the controller may be a plurality of controllers which is acentric. Each of the controllers is disposed on a bezel portion of a corresponding one of the display panels (for example, the controller is integrated in the information transmission device, that is, the controller has a function of data transmission and reception). After each of the controllers on the bezel portions receives the identity identifiers sent by controllers of other bezel portions spliced with the bezel portion, the controller determines a position of a display panel corresponding to the controller in an entirety of the spliced display device by means of negotiation performed between the controllers, thereby coordinating images to be displayed on the display panels.

Devices in the present disclosure, such as an identifier output device, ab identification device, the information transmission device and the controller, may be implemented with hardware, software, firmware, middleware, microcode, or a combination thereof. In a case of being implementation with hardware, each device or functional module may be implemented in one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), Central Processing Units (CPUs), Microcontrollers (MCUs), or other electronic units for executing functions described in this application, or a combination thereof. In a case of being implemented with software, techniques described in the present disclosure may be implemented by modules (e.g., processes, functions, etc.) that perform the functions described in the present disclosure. Software and codes may be stored in a storage and executed by a processor. The storage may be implemented in a processor or outside a processor.

When the plurality of controllers communicates with each other, the communication may be implemented by wireless means, such as the Bluetooth, the Wi-Fi, the Zigbee, the WWAN, or the like.

FIG. 1 is a schematic diagram showing a structure of a display panel bezel provided by some embodiments of the present disclosure. Referring to FIG. 1, the display panel bezel includes at least two bezel portions 100. Each of the at least two bezel portions is provided with an identifier output device 10, an identification device 20, and an information transmission device 30. The identifier output device 10 is configured to output an identity identifier of the bezel portion 100 corresponding to the identifier output device 10. The identification device 20 is configured to identify an identity identifier of another bezel portion 100 spliced with the bezel portion 100 corresponding to the identification device 20, when the bezel portion 100 corresponding to the identification device 20 is spliced with the another bezel portion 100. The information transmission device 30 is configured to output the identity identifier of the bezel portion 100 corresponding to the information transmission device 30 and the identity identifier of the another bezel portion 100 spliced with the bezel portion 100.

In some embodiments, the identifier output device 10 is disposed at one end of each of the bezel portions 100, and the identification device 20 is disposed at the other end of the bezel portion 100. According to the display panel bezel of FIG. 1, when two bezel portions 100 are spliced, one end of one bezel portion 100 provided with the identifier output device 10 is connected to one end, provided with the identification device 20, of another bezel portion 100 spliced with the bezel portion of the other bezel portion 100, so that the identifier output device 10 on the bezel portion 100 may be located within an identification range of the identification device 20 of the another bezel portion 100 spliced with the bezel portion 100, and the identification device 20 of the another bezel portion 100 spliced with the bezel portion 100 may obtain the identity identifier of the bezel portion 100.

Optionally, the identifier output device 10 of the another bezel portion 100 spliced with the bezel portion may be located within an identification range of the identification device 20 of the bezel portion 100, and the identification device 20 of the bezel portion 100 may identify the identity identifier of the another bezel portion spliced with the bezel portion 100.

The bezel portion mentioned in the embodiments of the present disclosure refers to a bezel portion on which the identifier output device 10, the identification device 20, and the information transmission device 30 are located, and the another bezel portion mentioned herein refers to an adjacent bezel portion spliced with the bezel portion.

In some embodiments of the present disclosure, the identity identifiers used to represent different bezel portions 100 may be character codes, such as numbers and/or letters, one-dimensional codes or two-dimensional codes, and they are of course not limited to character codes, such as numbers and/or letters.

In some embodiments, the identifier output device 10 may be configured to display the identity identifier of the bezel portion, i.e., to output the identity identifier of the bezel portion 100 by means of image display.

In some embodiments, the identifier output device 10 may also be configured to output the identity identifier of the bezel portion in a data transmission manner. For example, an information output unit capable of wirelessly outputting a signal is included in the identifier output device 10, and the identity identifier is outputted through a wireless signal. As another example, hardware for data transmission in a pairing manner, such as a radio frequency tag RFID, a NFC chip, etc., is included in the identifier output device.

Correspondingly, under a condition that the identifier output device 10 outputs a display image showing the identity identifier of the bezel portion, the identification device 20 may include an infrared detecting unit or an image scanning unit which may obtain, by means of infrared detection or image scanning, an identity identifier of another bezel portion spliced with the bezel portion. Under a condition that the identifier output device 10 includes an information output unit capable of performing data transmission, the identification device 20 may include a signal receiving unit for wirelessly receiving the identity identifier outputted by the identifier output device 10, such as a RFID radio tag, a NFC chip, etc.

The above-described specific examples of the identifier output device 10 and the identification device 20 are merely illustrative, and these devices are not limited to the specific examples, as long as the identifier output device 10 and the identification device 20 may distinguish the bezel portion and identify the other bezel portion.

In the display panel bezel provided by the embodiments of the present disclosure, each of the bezel portions 100 is provided with the information transmission device 30, and the information transmission device 30 is connected to the identification device 20 of the bezel portion 100 on which the information transmission device 30 is located, and the information transmission device 30 may obtain the identity identifier, identified by the identification device 20, of the another bezel portion 100 spliced with the bezel portion, and may transmit the identity identifier of the another bezel portion 100 together with a pre-stored identity identifier of the bezel portion 100 corresponding to the information transmission device 30 to the controller or the plurality of controllers, so that the controller or the plurality of controllers may determine the splicing regions of the entirety of the display device formed by the spliced bezel portions, based on the identity identifier of the bezel portion 100 and the identity identifier of the another bezel portion 100 spliced with the bezel portion 100.

In some embodiments, the bezel portions 100 of the display panel bezel as shown in FIG. 1 may include two types, and each of the bezel portions 100 may be a first type bezel portion or a second type bezel portion. Specifically, for the first type bezel portion, the identifier output device 10 in the first type bezel portion outputs a first identity identifier; and for the second type bezel portion, the identifier output device 10 in the second type bezel portion outputs a second identity identifier.

For example, the identity identifiers of the bezel portions 100 are different from each other, but the first type identity identifier and the second type identity identifier may be distinguished by different types of the identity identifiers. For example, the first identity identifier is a two-dimensional code, and the second identity identifier is a character code or a one-dimensional code, or both of the first identity identifier and the second identifier are character codes or one-dimensional codes, but may be distinguished by first characters of the two identity identifiers.

Optionally, the bezel portion 100 belonging to the first type bezel portion has a first length, and the bezel portion 100 belonging to the second type bezel portion has a second length.

Optionally, under a condition that the at least two bezel portions 100 are spliced to form an accommodating space and disposed around a display panel, the bezel portion 100 belonging to the first type bezel portion is arranged in a direction parallel to a first direction, and the bezel portion 100 belonging to the second type bezel portion is arranged in a direction parallel to a second direction. The first direction and the second direction may be two directions perpendicular to each other, such as an X direction and a Y direction.

In such an arrangement manner, when the bezel portions are spliced, bezel portions belonging to the first type bezel portion are disposed on peripheral edges of the display panel that is parallel to the first direction, and bezel portions belonging to the second type bezel portion are disposed on peripheral edges of the display panel that is parallel to the second direction.

Figure 2:
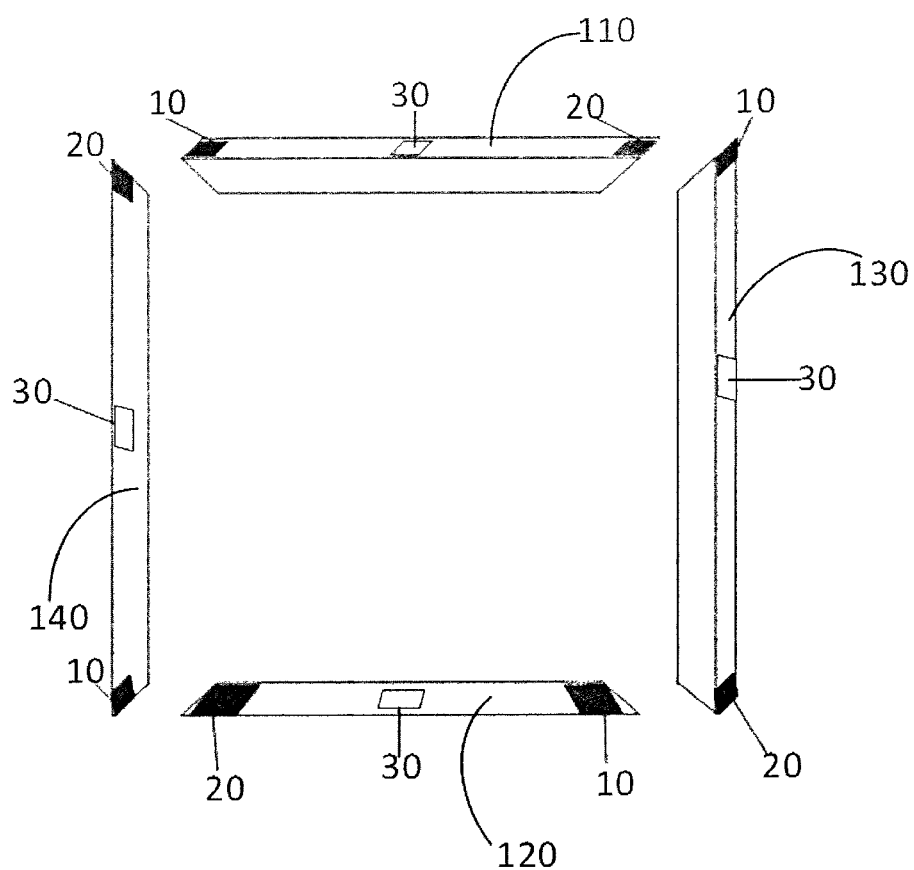
FIG. 2 is a schematic diagram showing a structure of a display panel bezel provided by some embodiments of the present disclosure.

A structure of a display panel bezel shown in FIG. 1 will be illustrated. Referring to both FIGS. 1 and 2, FIG. 2 is a schematic diagram showing a structure of a display panel bezel provided by some embodiments of the present disclosure. Under a condition that the display panel bezel includes four bezel portions, the display panel bezel includes a first bezel portion 110 and a second bezel portion 120 that are oppositely disposed, and a third bezel portion 130 and a fourth bezel portion 140 that are oppositely disposed. The first bezel portion 110 and the second bezel portion 120 belong to the first type bezel portions disposed in a horizontal direction, and the third bezel portion 130 and the fourth bezel portion 140 belong to the second type bezel portions disposed in a vertical direction.

Optionally, under a condition that the four bezel portions are spliced as shown in FIG. 2, two adjacent bezel portions of the four bezel portions are detachably connected to each other and an end of the first bezel portion 110 provided with the identification device 20 is spliced with an end of the third bezel portion 130 provided with the identifier output device 10, the other end of the third bezel portion 130 provided with the identification device 20 is spliced with an end of the second bezel portion 120 provided with the identifier output device 10, the other end of the second bezel portion 120 provided with the identification device 20 is spliced with an end of the fourth bezel portion 140 provided with the identifier output device 10, and the other end of the fourth bezel portion 140 provided with the identification device 20 is spliced with the other end of the first bezel portion 110 provided with the identifier output device 10.

Based on the above arrangement, the bezel portions form such a structure around the display panel that the identifier output device 10 on one bezel portion is adjacent to the identification device 20 on another bezel portion that is spliced with the bezel portion, and the bezel portions are connected in an end-to-end fashion to form a quadrangle around the display panel.

With the above-mentioned arrangement of the bezel portions, the identification device 20 of the first bezel portion 110 may obtain an identity identifier of the third bezel portion 130, the identification device 20 of the third bezel portion 130 may obtain an identity identifier of the second bezel portion 120, the identification device 20 of the second bezel portion 120 may obtain an identity identifier of the fourth bezel portion 140, and the identification device of the fourth bezel portion 140 may obtain an identity identifier of the first bezel portion 110.

In addition, since the first bezel portion 110 and the third bezel portion 130 belong to different types of bezel portions, and the second bezel portion 120 and the fourth bezel portion 140 belong to different types of bezel portions, types of the identity identifiers outputted by the identifier output devices 10 are different. By analyzing the identity identifiers of the first bezel portion 110 and the third bezel portion 130, and the identity identifiers of the second bezel portion 120 and the fourth bezel portion 140, respectively, a splicing type between the first bezel portion 110 and the third bezel portion 130 may be obtained to be a type of mutual perpendicularity between the bezel portions, and a splicing type between the second bezel portion 120 and the fourth bezel portion 140 is also the type of mutual perpendicularity, i.e., the first bezel portion 110 and the third bezel portion 130 are arranged perpendicularly to each other and the second bezel portion 120 and the fourth bezel portion 140 are also arranged perpendicularly to each other. Similarly, a splicing type between the first bezel portion 110 and the fourth bezel portion 140 and a splicing type between the second bezel portion 120 and the third bezel portion 130 are also the type of mutual perpendicularity.

Splicing types between two bezel portions mentioned in the embodiments of the present disclosure include the type of mutual perpendicularity, i.e., the two bezel portions are perpendicular to each other; and a type of collinearity, i.e., the two bezel portions are located in a same straight line.

With the above arrangement, under a condition that the identity identifier of each of the bezel portions, the identity identifier of another bezel portion spliced with the bezel portion, and the splicing types of the bezel portions are obtained, an arrangement in which each of the bezel portions is positioned relative to a display panel surrounded by the bezel portions may be determined by sequentially arranging the identity identifiers of the bezel portions, so as to obtain splicing regions formed by splicing the bezel portions.

Figure 3:
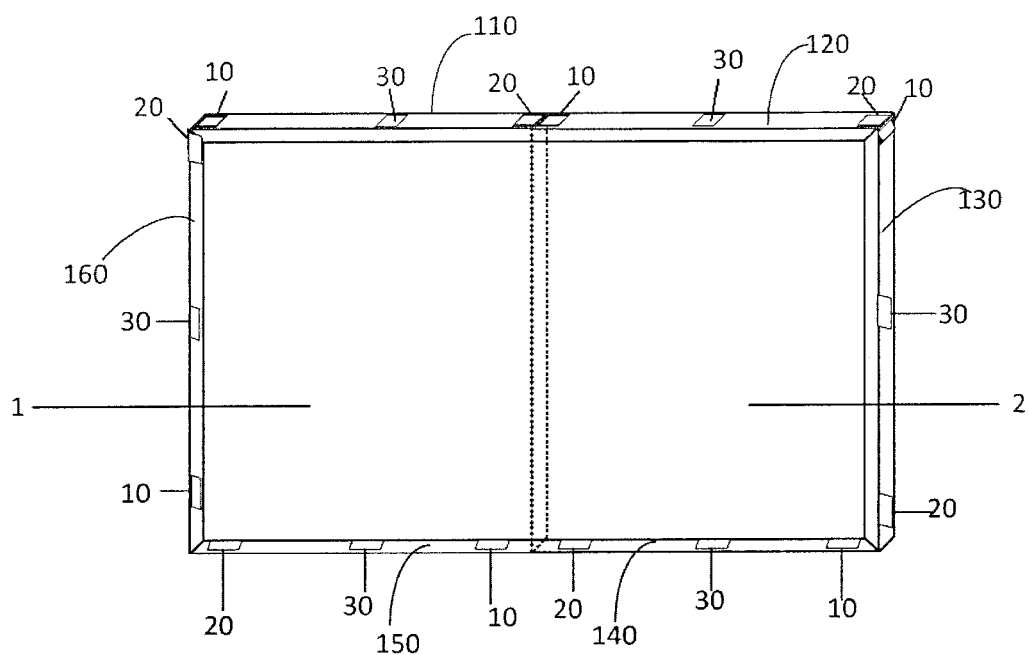
FIG. 3 is a schematic diagram showing a structure of a display panel bezel provided by some embodiments of the present disclosure.

FIG. 3 is a schematic diagram showing a structure of a display panel bezel provided by some embodiments of the present disclosure. Referring to FIG. 3, the display panel bezel includes six bezel portions. A first bezel portion 110 and a second bezel portion 120 are disposed along a first edge of the display panel bezel, a third bezel portion 130 is disposed along a second edge of the display panel bezel, a fourth bezel portion 140 and a fifth bezel portion 150 are disposed along a third edge of the display panel bezel, and a sixth bezel portion 160 is disposed along a fourth edge of the display panel bezel.

The first edge is parallel to the third edge (corresponding to a first direction, for example, an X direction) and the second edge is parallel to the fourth edge (corresponding to a second direction, for example, a Y direction). The first bezel portion 110, the second bezel portion 120, the fourth bezel portion 140 and the fifth bezel portion 150 belong to the first type bezel portion, and the identifier output devices 10 disposed on the first, the second, the fourth and the fifth bezel portions output a first identity identifier. Moreover, the third bezel portion 130 and the sixth bezel portion 160 belong to a second type bezel portion, and the identifier output devices 10 disposed on the third and the sixth bezel portions output a second identity identifier.

In the structure shown in FIG. 3, optionally, an end of each of the bezel portions provided with the identifier output device 10 is spliced with an end provided with the identification device 20 of another bezel portion that is spliced with the bezel portion. According to this rule, a plurality of bezel portions is spliced to form a structure in which the identifier output device 10 of one bezel portion is connected to the identification device 20 of another bezel portion.

In the structure shown in FIG. 3, the first bezel portion 110 may obtain, by the identification device 20 on the first bezel portion 110, an identity identifier of the second bezel portion 120; and the identity identifier of the first bezel portion 110 and the identity identifier of the second bezel portion 120 belong to the same type. Therefore, a splicing type between the first bezel portion 110 and the second bezel portion 120 may be determined as the type of collinearity, i.e., the first bezel portion 110 and the second bezel portion 120 are arranged along a same straight line. In addition, the second bezel portion 120 may obtain, by the identification device 20 on the second bezel portion 120, an identity identifier of the third bezel portion 130; and the identity identifier of the second bezel portion 120 and the identity identifier of the third bezel portion 130 belong to different types. Therefore, a splicing type between the second bezel portion 120 and the third bezel portion 130 may be determined as the type of mutual perpendicularity, i.e., the second bezel portion 120 and the third bezel portion 130 are arranged perpendicularly to each other. Furthermore, the third bezel portion 130 may obtain, by the identification device 20 on the third bezel portion, an identity identifier of the fourth bezel portion 140; and the identity identifier of the third bezel portion 130 and the identity identifier of the fourth bezel portion 140 belong to different types. Therefore, a splicing type between the third bezel portion 130 and the fourth bezel portion 140 may be determined as the type of mutual perpendicularity, i.e., the third bezel portion 130 and the fourth bezel portion 140 are spliced perpendicularly to each other. The fourth bezel portion 140 may obtain, by the identification device 20 on the fourth bezel portion 140, an identity identifier of the fifth bezel portion 150; and the identity identifier of the fourth bezel portion 140 and the identity identifier of the fifth bezel portion 150 belong to the same type. Therefore, a splicing type between the fourth bezel portion 140 and the fifth bezel portion 150 may be determined as the type of collinearity, i.e., the fourth bezel portion 140 and the fifth bezel portion 150 are spliced along the same straight line. Furthermore, the fifth bezel portion 150 may obtain, by the identification device 20 on the fifth bezel portion, an identity identifier of the sixth bezel portion 160; and the identity identifier of the fifth bezel portion 150 and the identity identifier of the sixth bezel portion 160 belong to different types. Therefore, a splicing type between the fifth bezel portion 150 and the sixth bezel portion 160 may be determined as the type of mutual perpendicularity, i.e., the fifth bezel portion 150 and the sixth bezel portion 160 are spliced perpendicularly to each other. Furthermore, the sixth bezel portion 160 may obtain, by the identification device 20 on the sixth bezel portion 160, an identity identifier of the first bezel portion 110; and the identity identifier of the sixth bezel portion 160 and the identity identifier of the first bezel portion 110 belong to different types. Therefore, a splicing type between the sixth bezel portion 160 and the first bezel portion 110 may be determined as the type of mutual perpendicularity, i.e., the sixth bezel portion 160 and the first bezel portion 100 are spliced perpendicularly to each other. In this way, under a condition that the identity identifier of each of the bezel portions, an identity identifier of another bezel portion that is spliced with the bezel portion, and the splicing types are obtained, an arrangement in which each of the bezel portions is positioned relative to a display panel surrounded by the bezel portions may be determined by sequentially arranging the identity identifiers of the bezel portions. Moreover, under a condition that lengths of the bezel portions are given, splicing regions formed by splicing the bezel portions may be obtained.

When the identity identifiers of the bezel portions are arranged in a sequence as shown in FIG. 3, an entirety of the display panel may be divided based on this sequence, and splicing sub-regions 1 and 2 of the display panel may be determined.

Figure 4:
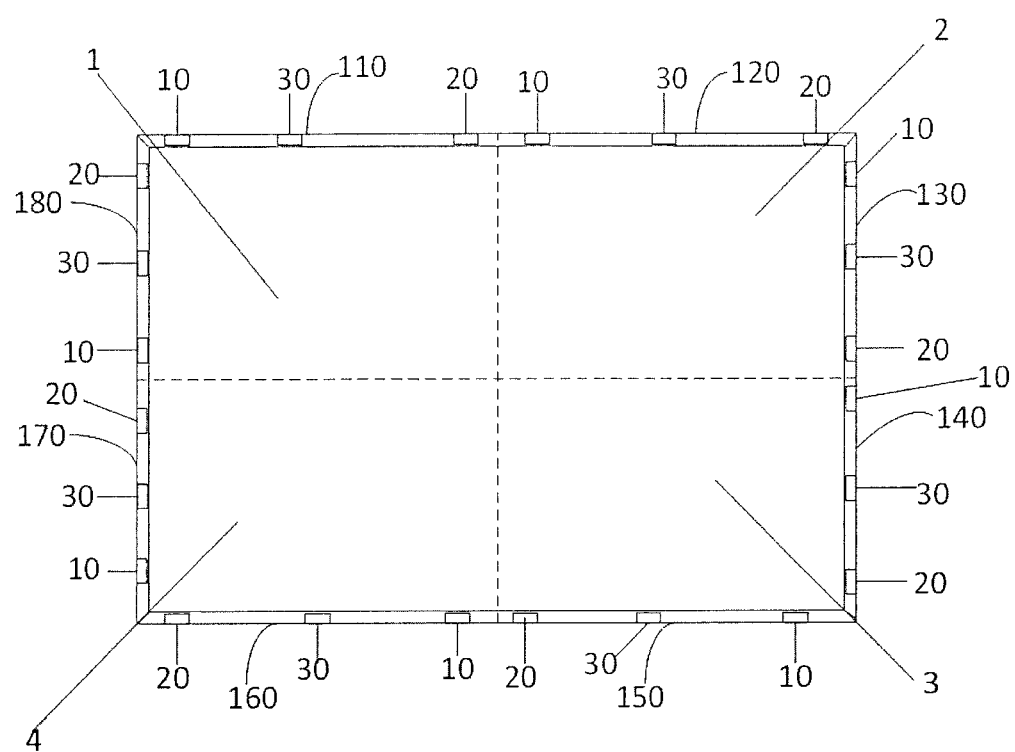
FIG. 4 is a schematic diagram showing a structure of a display panel bezel provided by some embodiments of the present disclosure.

FIG. 4 is a schematic diagram showing a structure of a display panel bezel provided by some embodiments of the present disclosure. Referring to FIG. 4, the display panel bezel includes eight bezel portions. A first bezel portion 110 and a second bezel portion 120 spliced together are disposed along a first edge of the display panel bezel, a third bezel portion 130 and a fourth bezel portion 140 spliced together are disposed along a second edge of the display panel bezel, a fifth bezel portion 150 and a sixth bezel portion 160 spliced together are disposed along a third edge of the display panel bezel, and a seventh bezel portion 170 and an eighth bezel portion 180 spliced together are disposed along a fourth edge of the display panel bezel.

In the structure shown in FIG. 4, the first edge is parallel to the third edge (corresponding to a first direction, such as the X direction), and the second edge is parallel to the fourth edge (corresponding to a second direction, such as the Y direction). The first bezel portion 110, the second bezel portion 120, the fifth bezel portion 150, and the sixth bezel portion 160 belong to the first type bezel portion, and identifier output devices 10 disposed on the first bezel portion 110, the second bezel portion 120, the fifth bezel portion 150, and the sixth bezel portion 160 output a first identity identifier. Moreover, the third bezel portion 130, the fourth bezel portion 140, the seventh bezel portion 170, and the eighth bezel portion 180 belong to the second type bezel portion, and identifier output devices 10 disposed on the third bezel portion 130, the fourth bezel portion 140, the seventh bezel portion 170, and the eighth bezel portion output a second identity identifier.

Optionally, similar to the manner in which the bezel portions of the display panel bezel are spliced as shown in FIG. 3, an end of each of the bezel portions provided with the identifier output device 10 is spliced with an end, provided with the identification device 20, of another bezel portion that is spliced with the bezel portion. According to this rule, a plurality of bezel portions is spliced to form a structure in which the identifier output device 10 of one bezel portion is adjacent to the identification device 20 of anther bezel portion.

The bezel shown in FIG. 4 is arranged according to the same rule as that for the display panel bezel shown in FIG. 3, and each of the bezel portions may obtain an identity identifier of another bezel portion that is spliced with the bezel portion; and based on the obtained identity identifier of the another bezel portion, a splicing type between the bezel portion and the another bezel portion that is spliced with the bezel portion may be obtained. On basis of this, when the identity identifier of each of the bezel portions, the identity identifier of another bezel portion that is spliced with the bezel portion, and the splicing types are obtained, an arrangement in which each of the bezel portions is positioned relative to a display panel surrounded by the bezel portions may be obtained by sequentially arranging the identity identifiers of the bezel portions. Moreover, under a condition that lengths of the bezel portions are given, splicing regions formed by splicing the bezel portions may be obtained.

Specifically, when the identity identifiers of the bezel portions are arranged in a sequence as shown in FIG. 4, the entirety of the display panel may be divided based on this sequence, and splicing sub-regions 1, 2, 3 and 4 of the display panel may be determined.

In the arrangement of the structure of the display panel bezel provided by some embodiments of the present disclosure, under a condition that at least two bezel portions are spliced to form an accommodating space for surrounding the display panel, besides following the above arrangement rule that each of the bezel portions belonging to the first type bezel portion is arranged in a direction parallel to the first direction and each of the bezel portions belonging to the second type bezel portion is arranged in a direction parallel to the second direction, placement orientations of the first type bezel portion and the second type bezel portion may be set in advance to be fixed. For example, besides arranging each of the bezel portions belonging to the first type bezel portion in a direction parallel to the first direction, directions pointing from ends of the bezel portions provided with the identifier output devices to other ends of the bezel portions provided with the identification devices are set to be the same; and besides arranging each of the bezel portions belonging to the second type bezel portion in a direction parallel to the second direction, directions pointing from ends of the bezel portions provided with the identifier output devices to other ends of the bezel portions provided with the identification devices are set to be the same.

Figure 5:
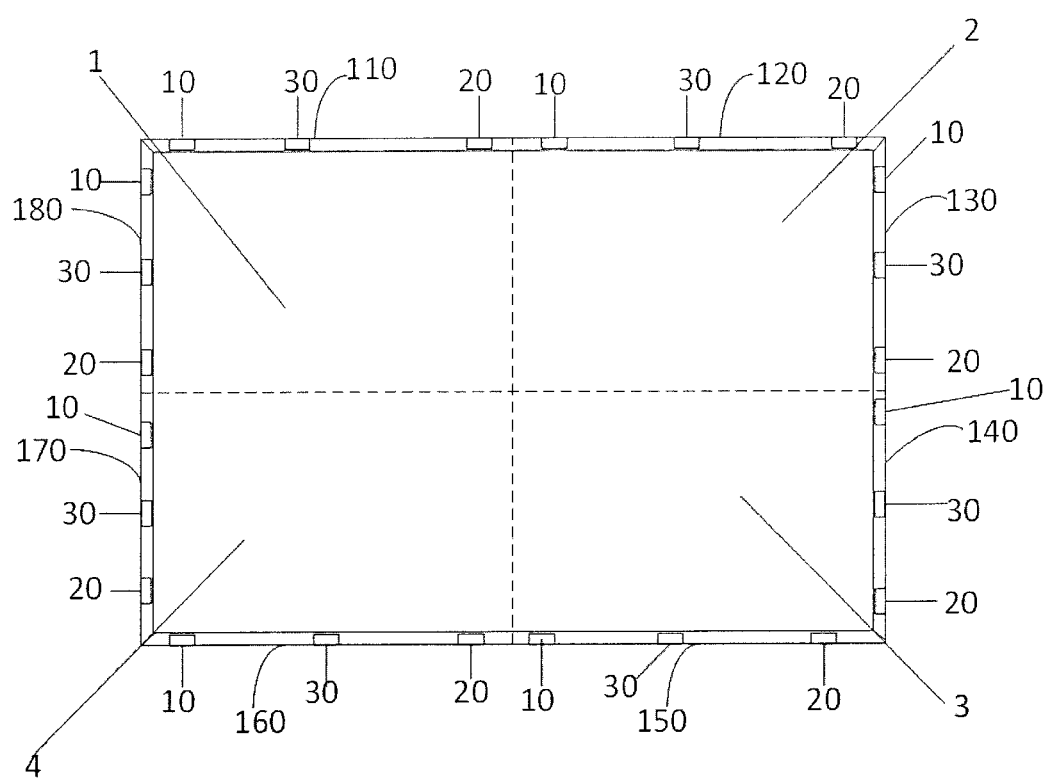
FIG. 5 is a schematic diagram showing a structure of a display panel bezel provided by some embodiments of the present disclosure.

Specifically, taking the structure shown in FIG. 5 as an example, a display panel bezel includes eight bezel portions. A first bezel portion 110 and a second bezel portion 120 spliced together are disposed along a first edge of the display panel bezel; a third bezel portion 130 and a fourth bezel portion 140 spliced together are disposed along a second edge of the display panel bezel; and a fifth bezel portion 150 and a sixth bezel portion 160 spliced together are disposed along a third edge of the display panel bezel; and a seventh bezel portion 170 and an eighth bezel portion 180 spliced together are disposed along a fourth edge of the display panel bezel.

In the structure shown in FIG. 5, the first edge is parallel to the third edge (corresponding to a first direction, such as the X direction), and the second edge is parallel to the fourth edge (corresponding to a second direction, such as the Y direction). The first bezel portion 110, the second bezel portion 120, the fifth bezel portion 150 and the sixth bezel portion 160 belong to the first type bezel portion, and identifier output devices 10 disposed on the first bezel portion 110, the second bezel portion 120, the fifth bezel portion 150 and the sixth bezel portion 160 output a first identity identifier. Moreover, the third bezel portion 130, the fourth bezel portion 140, the seventh bezel portion 170 and the eighth bezel portion 180 belong to the second type bezel portion, and identifier output devices 10 disposed on the third bezel portion 130, the fourth bezel portion 140, the seventh bezel portion 170 and the eighth bezel portion 180 output a second identity identifier.

Different from the structure shown in FIG. 4, in the structure shown in FIG. 5, on the first bezel portion 110, the second bezel portion 120, the fifth bezel portion 150, and the sixth bezel portion 160, directions pointing from ends of the first bezel portion 110, the second bezel portion 120, the fifth bezel portion 150, and the sixth bezel portion 160 provided with identifier output devices 10 to other ends of the bezel portions provided with identification devices 20 all direct towards a right side of FIG. 5. On the third bezel portion 130, the fourth bezel portion 140, the seventh bezel portion 170, and the eighth bezel portion 180, directions pointing from ends of the third bezel portion 130, the fourth bezel portion 140, the seventh bezel portion 170, and the eighth bezel portion 180 provided with identifier output devices 10 to other ends of the bezel portions provided with identification devices 20 all direct towards a lower side of FIG. 5.

In the above arrangement according to FIG. 5, an end of the fourth bezel portion 140 provided with the identification device 20 is spliced with an end of the fifth bezel portion 150 provided with the identification device 20; an end of the eighth bezel portion 180 provided with the identifier output device 10 is spliced with an end of the first bezel portion 110 provided with the identifier output device 10. Both the fourth bezel portion 140 and the fifth bezel portion 150 cannot obtain identity identifiers of the bezel portions spliced with them, and identity identifiers of the first bezel portion 110 and the eighth bezel portion 180 cannot be identified by the other bezel portions spliced with them. Furthermore, in other splicing positions of the bezel portions, an end of a bezel portion of the bezel portions provided with the identifier output device 10 is spliced with an end, provided with the identification device 20, of another bezel portion spliced with the bezel portion, and the another bezel portion may obtain, through identification device 20, an identity identifier of the bezel portion splicing with the another bezel portion.

In the structure shown in FIG. 5, since a position at which an end of the fourth bezel portion 140 provided with the identification device 20 is spliced with an end of the fifth bezel portion 150 provided with the identification device 20, and a position at which an end of the eighth bezel portion 180 provided with the identifier output device 10 is spliced with an end of the first bezel portion 110 provided with the identifier output device 10 form two opposite corner positions of the display panel, the identity identifiers of the bezel portions may also be sequentially arranged by analyzing the identified identity identifiers and the splicing types of the bezel portions in this arrangement and a position at which each of the bezel portions is located relative to the display panel surrounded by the bezel portions may be determined. In addition, as compared with other arrangements, such an arrangement manner may enable determination of the two corner positions of the display panel and thus an entire region of the display panel may be determined. On basis of this, the splicing regions formed by splicing the bezel portions may be obtained more accurately.

Similarly, the bezel portions for the display panel bezels as shown in FIGS. 2 and 3 may also be arranged according to the arrangement rule of the bezel portions as shown in FIG. 5, thereby determining the splicing regions formed by splicing the bezel portions, and this will not be described in detail herein.

The structures as shown in FIGS. 2 to 5 are merely a few specific examples of the display panel bezel of the present disclosure, and the display panel bezel arranged according to the principle of the present disclosure is not limited to the above-mentioned several structures only. For example, the display panel bezel may also include more than eight bezel portions to be spliced into many different forms. Each of the possible forms will not described in detail herein, but every possible arrangement manner falls within the protection scope of the present disclosure.

Some embodiments of the present disclosure further provide a display terminal including at least one display panel. Each of the at least one display terminal further includes at least two bezel portions of the above display panel bezel of the present disclosure. Each of the at least two bezel portions is disposed along an edge of the display panel.

Optionally, the display terminal further includes a controller which is connected to the information transmission device of each of the bezel portions of the display panel bezel. The controller is configured to obtain an identity identifier of each of the bezel portions and an identity identifier of another bezel portion that is spliced with the bezel portion, determine splicing sub-regions formed by splicing the bezel portions in the display panel based on the identity identifier of each of the bezel portions and the identity identifier of another bezel portion that is spliced with the bezel portion, and segment a current output image based on the determined splicing sub-regions so that a portion of the segmented image is displayed in each of the splicing sub-regions.

The display terminal of the present disclosure may obtain the identity identifier of each of the bezel portions of the display panel bezel and the identity identifier of another bezel portion that is spliced with the bezel portion, and analyze positions of the bezel portions relative to the display panel based on the obtained identity identifiers, so as to determine ranges of actual splicing sub-regions of the display panel. Therefore, when an image to be displayed is segmented, the image may be segmented into multiple sub-images according to the ranges of the actual splicing sub-regions, so that the display panel may display the sub-images in corresponding splicing sub-regions in a splicing manner, a cropping processing or a scaling processing of the image may be reduced, and a problem that a display effect of the image cannot be truly exhibited is addressed.

It may be understood that technical solutions provided by some embodiments of the present disclosure may effectively reduce the cropping processing or the scaling processing of the image, and due to limitations of a resolution, an aspect ratio, etc. of an image to be displayed, portions of the display terminal located at edges of the display terminal may need to appropriately stretch portions belonging to the image and located at the edges of the image to be displayed, so as to reduce discomfort that the entirety of the image to be displayed may bring to a viewer.

The present disclosure further provides a spliced display device that includes a plurality of the display terminals of the present disclosure as described above. The identification device of each of the bezel portions of the display panel bezel of each display terminal is configured to read identity identifiers of bezel portions of another display terminal that is spliced with the display terminal.

Based on the above detailed description, those skilled in the art may understand specific structures of spliced display devices including the display panel bezels provided in some embodiments of the present disclosure, which will not be described in detail herein again.

Figure 6:
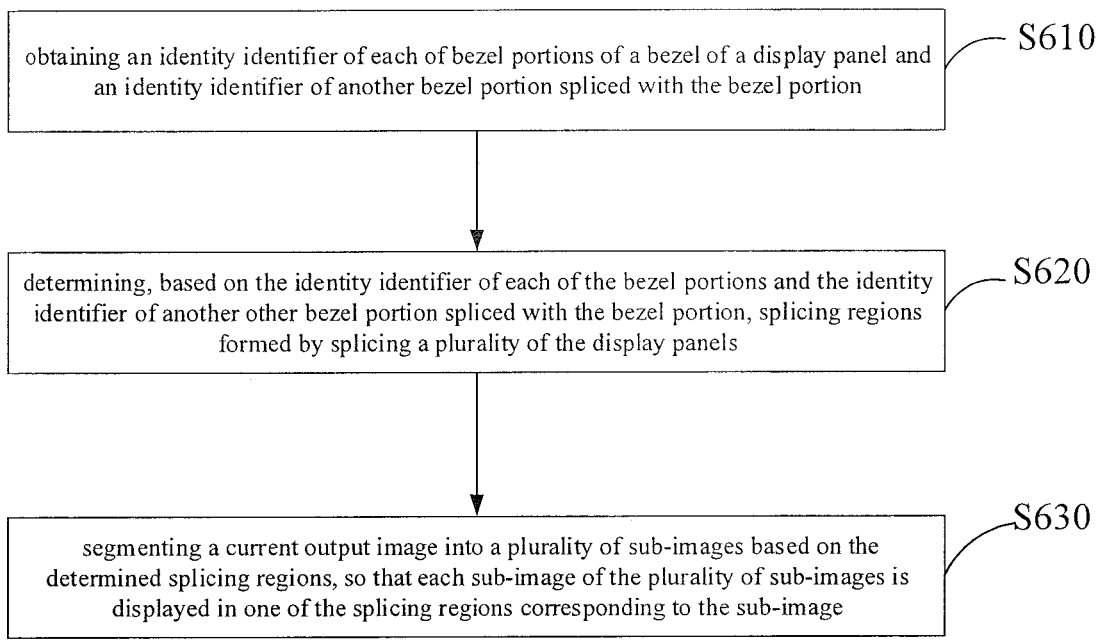
FIG. 6 is a flow chart of an image output control method provided by some embodiments of the present disclosure.

The present disclosure further provides an image output control method that may be applied to the above display terminal or the spliced display device. As shown in FIG. 6, the image output control method includes steps S610 to S630.

S610: obtaining an identity identifier of each of bezel portions of a bezel of a display panel and an identity identifier of another bezel portion spliced with the bezel portion.

S620: determining, based on the identity identifier of each of the bezel portions and the identity identifier of another other bezel portion spliced with the bezel portion, splicing regions formed by splicing a plurality of the display panels.

S630: segmenting a current output image into a plurality of sub-images based on the determined splicing regions, so that each sub-image of the plurality of sub-images is displayed in one of the splicing regions corresponding to the sub-image.

Figure 7:
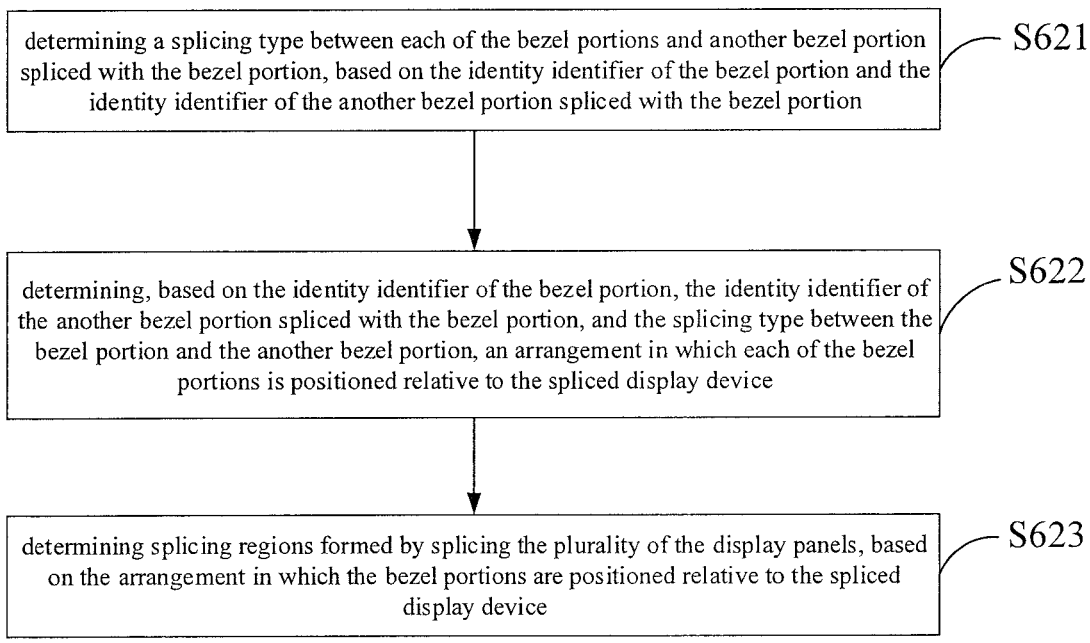
FIG. 7 is a detailed flowchart of a step S620 in FIG. 6.

In some embodiments, as shown in FIG. 7, the step S620 of determining, based on the identity identifier of each of the bezel portions and the identity identifier of another other bezel portion spliced with the bezel portion, splicing regions formed by splicing a plurality of the display panels, includes sub-steps S621 to S623.

S621: determining a splicing type between each of the bezel portions and another bezel portion spliced with the bezel portion, based on the identity identifier of the bezel portion and the identity identifier of the another bezel portion spliced with the bezel portion; wherein the splicing type includes a splicing type of mutual perpendicularity between the bezel portion and the another bezel portion spliced with the bezel portion, i.e. the bezel portion and the another bezel portion spliced with the bezel portion are arranged perpendicularly to each other; and a splicing type of collinearity of the bezel portion and the another bezel portion spliced with the bezel portion, i.e., the bezel portion and the another bezel portion spliced with the bezel portion are arranged on a same straight line.

S622: determining, based on the identity identifier of the bezel portion, the identity identifier of the another bezel portion spliced with the bezel portion, and the splicing type between the bezel portion and the another bezel portion, an arrangement in which each of the bezel portions is positioned relative to the spliced display device.

S623: determining splicing regions formed by splicing the plurality of the display panels, based on the arrangement in which the bezel portions are positioned relative to the spliced display device.

Referring to FIGS. 2 to 5, in the image output control method using the display panel bezel according to some embodiments of the present disclosure, each of the bezel portions is the first type bezel portion or the second type bezel portion. Under a condition that the bezel portion is the first type bezel portion, the identifier output device outputs a first identity identifier, and under a condition that the bezel portion is the second type bezel portion, the identifier output device outputs a second identity identifier. Under a condition that each of the bezel portions belonging to the first type bezel portion is arranged in a direction parallel to a first direction, and each of the bezel portions belonging to the second type bezel portion is arranged in a direction parallel to a second direction, the step S621 of determining a splicing type between each of the bezel portions and another bezel portion spliced with the bezel portion, based on the identity identifier of the bezel portion and the identity identifier of the another bezel portion spliced with the bezel portion, includes: determining that the splicing type is the splicing type of collinearity, i.e., the bezel portion and the another bezel portion spliced with the bezel portion are arranged on the same line, under a condition that both the identity identifier of the bezel portion and the identity identifier of the another bezel portion are the first identity identifier or the second identity identifier; and determining that the splicing type is the splicing type of mutual perpendicularity, i.e., the bezel portion and the another bezel portion spliced with the bezel portion are arranged perpendicularly to each other, under a condition that one of the identity identifier of the bezel portion and the identity identifier of the another bezel portion is the first identity identifier and the other of the identity identifier of the bezel portion and the identity identifier of the another bezel portion is the second identity identifier.

In addition, in the step S622 of determining, based on the identity identifier of the bezel portion, the identity identifier of the another bezel portion spliced with the bezel portion, and the splicing type between the bezel portion and the another bezel portion, an arrangement in which each of the bezel portions is positioned relative to the spliced display device, the bezel portions are positioned based on the identity identifier of each of the bezel portions, the identity identifier of the another bezel portion spliced with the bezel portion, and the splicing type between the bezel portion and the another bezel portion; and in accordance with a shape formed by the positioning of the bezel portions, the arrangement in which each of the bezel portions is positioned relative to the spliced display device is determined.

Reference may be made to the description with respect to FIGS. 2 to 5 for determining the splicing type between the bezel portion and the another bezel portion and determining the arrangement in which each of the bezel portions is positioned relative to the spliced display device in accordance with the shape formed by the positioning of the bezel portions, and details thereof are not described again herein.

By providing each of the bezel portions with the identity identifier and the identification device that may identify an identity identifier of another bezel portion spliced with the bezel portion in the display panel bezel, the display terminal, the spliced display device and the image output control method of the present disclosure, the technical solutions of the present disclosure are capable of solving the problem that a display effect of an image may not be truly exhibited due to the requirement of cropping or scaling an image when the image is spliced to be displayed.

The above are preferred embodiments of the present disclosure, and it may be understood that those skilled in the art may also make several improvements and modifications without departing from the principles of the present disclosure, and the improvements and the modifications also fall within the scope of protection of the present disclosure.

What is claimed is:

1. A display panel bezel, comprising:
at least two bezel portions connected to each other to form an accommodating space for mounting a display panel,
wherein each of the at least two bezel portions comprises an identity identifier and an identification device, the identification device is configured to obtain at least one identity identifier of at least one other bezel portion spliced with the bezel portion,
wherein each of the at least two bezel portions further comprises an information transmission device, the information transmission device is configured to transmit the identity identifier of the bezel portion and the at least one identity identifier of the at least one other bezel portion,
wherein each of the at least two bezel portions is provided with an identifier output device configured to output the identity identifier of the bezel portion,
wherein the identifier output device is located at a first end of the bezel portion, the identification device is located at a second end of the bezel portion other than the first end, and the information transmission device is located between the identifier output device and the identification device,
wherein the at least two bezel portions comprise a first bezel portion, a second bezel portion, a third bezel portion and a fourth bezel portion, wherein one end of the first bezel portion provided with the identifier output device is connected to one end of the second bezel portion provided with the identifier output device, and one end of the third bezel portion provided with the identification device is connected to one end of the fourth bezel portion provided with the identification device.

2. The display panel bezel according to claim 1, wherein each of the bezel portions is a first type bezel portion or a second type bezel portion;
in response to the bezel portion being the first type bezel portion, the identifier output device is configured to output a first identity identifier; or
in response to the bezel portion being the second type bezel portion, the identifier output device is configured to output a second identity identifier.

3. The display panel bezel according to claim 2, wherein the first type bezel portion has a first length and the second type bezel portion has a second length.

4. The display panel bezel according to claim 2, wherein in a state in which the at least two bezel portions form the accommodating space, one of the at least two bezel portions belonging to the first type bezel portion is arranged in a direction parallel to a first direction, and one of the at least two bezel portions belonging to the second type bezel portion is arranged in a direction parallel to a second direction.

5. A display panel bezel, comprising:
at least two bezel portions connected to each other to form an accommodating space for mounting display panel,
wherein each of the at least two bezel portions comprises an identity identifier and an identification device, the identification device is configured to obtain at least one identity identifier of at least one other bezel portion spliced with the bezel portion,
wherein each of the at least two bezel portions further comprises an information transmission device, the information transmission device is configured to transmit the identity identifier of the bezel portion and the at least one identity identifier of the at least one other bezel portion,
wherein each of the at least two bezel portions is provided with an identifier output device configured to output the identity identifier of the bezel portion,
wherein the at least two bezel portions comprise a first bezel portion, a second bezel portion, a third bezel portion and a fourth bezel portion, wherein a second end of the first bezel portion provided with the identification device is connected to a first end of the second bezel portion provided with the identifier output device, a second end of the second bezel portion provided with the identification device is connected to a first end of the third bezel portion provided with the identifier output device, a second end of the third bezel portion provided with the identification device is connected to a first end of the fourth bezel portion provided with the identifier output device, and a second end of the fourth bezel portion provided with the identification device is connected to a first end of the first bezel portion provided with the identifier output device.

6. The display panel bezel according to claim 1, wherein the identity identifiers are character codes, one-dimensional codes or two-dimensional codes; and/or
the identifier output device is configured to display the identity identifier of the bezel portion, or to output the identity identifier of the bezel portion in a data transmission manner.

7. The display panel bezel according to claim 1, wherein the identification device comprises an infrared detecting unit, an image scanning unit or a signal receiving unit.

8. The display panel bezel according to claim 1, wherein, in a state in which the at least two bezel portions form the accommodating space, two adjacent ones of the at least two bezel portions are detachably connected to each other.

9. The display panel bezel according to claim 1, wherein in a state in which the at least two bezel portions form the accommodating space, the accommodating space is formed as a quadrangular structure in which edges of the quadrangular structure is enclosed.

10. A display terminal, comprising:
at least one display panel, and
the display panel bezel according to claim 1, wherein each of the bezel portions of the display panel bezel is disposed along an edge of the at least one display panel.

11. A spliced display device, comprising:
a plurality of the display terminals according to claim 10, wherein the identification device of each of the bezel portions of the display panel bezel of each of the display terminals is configured to read at least one identity identifier of at least one other bezel portion spliced with the bezel portion.

12. An image output control method applied to the spliced display device according to claim 11, wherein the image output control method comprises:
obtaining an identity identifier of a bezel portion of a plurality of bezel portions for one of a plurality of display panels and an identity identifier of a bezel portion of the plurality of bezel portions for another of the plurality of display panels spliced with the display panel;
determining, based on the identity identifier of each of the plurality of bezel portions and at least one identity identifier of at least one other bezel portion spliced with the bezel portion of the plurality of bezel portions, splicing regions formed by splicing the plurality of the display panels; and segmenting a current output image based on the determined splicing regions, so that each of the splicing regions displays a portion of the segmented image.

13. The image output control method according to claim 12, wherein the determining, based on the identity identifier of each of the plurality of bezel portions and at least one identity identifier of at least one other bezel portion spliced with the bezel portion of the plurality of bezel portions, splicing regions formed by splicing the plurality of the display panels, comprises:

determining a splicing type between each of the bezel portions and the at least one other bezel portion spliced with the bezel portion based on the identity identifier of the bezel portion and the at least one identity identifier of the at least one other bezel portion spliced with the bezel portion, wherein the splicing type is a splicing type of mutual perpendicularity in which the bezel portion and the at least one other bezel portion spliced with the bezel portion are arranged perpendicularly to each other, or a splicing type of collinearity in which the bezel portion and the at least one other bezel portion spliced with the bezel portion are arranged along a same straight line;

determining, based on the identity identifier of the bezel portion, the identity identifier of the at least one other bezel portion spliced with the bezel portion, and the splicing type between the bezel portion and the at least one other bezel portion, an arrangement in which each of the bezel portions is positioned relative to the spliced display device; and determining, based on the arrangement in which each of the bezel portions is positioned relative to the spliced display device, the splicing regions formed by splicing the plurality of the display panels of the spliced display device.

14. An image output control method applied to a spliced display device, wherein, the spliced display device comprises a plurality of the display terminals, the display terminal includes: at least one display panel, and a display panel bezel, the display panel bezel comprises at least two bezel portions connected to each other to form an accommodating space for mounting a display panel, each of the at least two bezel portions comprises an identity identifier and an identification device, the identification device is configured to obtain at least one identity identifier of at least one other bezel portion spliced with the bezel portion, each of the bezel portions of the display panel bezel is disposed along an edge of the at least one display panel, the identification device of each of the bezel portions of the display panel bezel of each of the display terminals is configured to read at least one identity identifier of at least one other bezel portion spliced with the bezel portion, wherein the image output control method comprises:

obtaining an identity identifier of a bezel portion of a plurality of bezel portions for one of a plurality of display panels and an identity identifier of a bezel portion of the plurality of bezel portions for another of the plurality of display panels spliced with the display panel;

determining, based on the identity identifier of each of the plurality of bezel portions and at least one identity identifier of at least one other bezel portion spliced with the bezel portion of the plurality of bezel portions, splicing regions formed by splicing the plurality of the display panels; and segmenting a current output image based on the determined splicing regions, so that each of the splicing regions displays a portion of the segmented image, wherein the determining, based on the identity identifier of each of the plurality of bezel portions and at least one identity identifier of at least one other bezel portion spliced with the bezel portion of the plurality of bezel portions, splicing regions formed by splicing the plurality of the display panels, comprises:

determining a splicing type between each of the bezel portions and the at least one other bezel portion spliced with the bezel portion based on the identity identifier of the bezel portion and the at least one identity identifier of the at least one other bezel portion spliced with the bezel portion, wherein the splicing type is a splicing type of mutual perpendicularity in which the bezel portion and the at least one other bezel portion spliced with the bezel portion are arranged perpendicularly to each other, or a splicing type of collinearity in which the bezel portion and the at least one other bezel portion spliced with the bezel portion are arranged along a same straight line;

determining, based on the identity identifier of the bezel portion, the identity identifier of the at least one other bezel portion spliced with the bezel portion, and the splicing type between the bezel portion and the at least one other bezel portion, an arrangement in which each of the bezel portions is positioned relative to the spliced display device; and determining, based on the arrangement in which each of the bezel portions is positioned relative to the spliced display device, the splicing regions formed by splicing the plurality of the display panels of the spliced display device, wherein the bezel portion is a first type bezel portion or a second type bezel portion;

the first type bezel portion has a first identity identifier, and the second type bezel portion has a second identity identifier;

under a condition that the bezel portion belongs to the first type bezel portion, the bezel portion is arranged in a direction parallel to a first direction, and under a condition that the bezel portion belongs to the second type bezel portion, the bezel portion is arranged in a direction parallel to a second direction; and the determining the splicing type between each of the bezel portions and the at least one other bezel portion spliced with the bezel portion based on the identity identifier of the bezel portion and the at least one identity identifier of the at least one other bezel portion spliced with the bezel portion, comprises:

in response to determining that each of the identity identifier of the bezel portion and the identity identifier of the at least one other bezel portion spliced with the bezel portion is the first identity identifier or the second identity identifier, determining that the splicing type between the bezel portion and the at least one other bezel portion spliced with the bezel portion is the splicing type of collinearity; or in response to determining that one of the identity identifier of the bezel portion and the identity identifier of the at least one other bezel portion spliced with the bezel portion is the first identity identifier and the other of the identity identifier of the bezel portion and the identity identifier of the at least one other bezel portion spliced with the bezel portion is the second identity identifier, determining that the splicing type between the bezel portion and the at least one other bezel portion spliced with the bezel portion is the splicing type of mutual perpendicularity.

15. The image output control method according to claim 13, wherein the determining, based on the identity identifier of the bezel portion, the identity identifier of the at least one other bezel portion spliced with the bezel portion, and the splicing type between the bezel portion and the at least one other bezel portion, an arrangement in which each of the bezel portions is positioned relative to the spliced display device, comprises:

positioning the bezel portions based on the identity identifier of each of the bezel portions, the identity identifier of the at least one other bezel portion spliced with the bezel portion, and the splicing type between the bezel portion and the at least one other bezel portion; and determining the arrangement in which each of the bezel portions is positioned relative to the spliced display device in accordance with a shape formed by the positioning.

16. The display terminal according to claim 10, further comprising:

a controller, connected to an information transmission device of each of the bezel portions of the display panel bezel and configured to:

obtain an identity identifier of each of the bezel portions and at least one identity identifier of at least one other bezel portion spliced with the bezel portion;

determine splicing regions formed by splicing the bezel portions for the at least one display panel based on the identity identifier of each of the bezel portions and the at least one identity identifier of the at least one other bezel portion spliced with the bezel portion; and segment a current output image based on the determined splicing regions such that each of the splicing regions displays a portion of the segmented image.

* * * * *